June 3, 1958  H. W. NORRIS  2,837,217
HOLDER FOR CLAMPING COMPRESSED GAS BOTTLES ON TRAILERS
Filed July 12, 1956
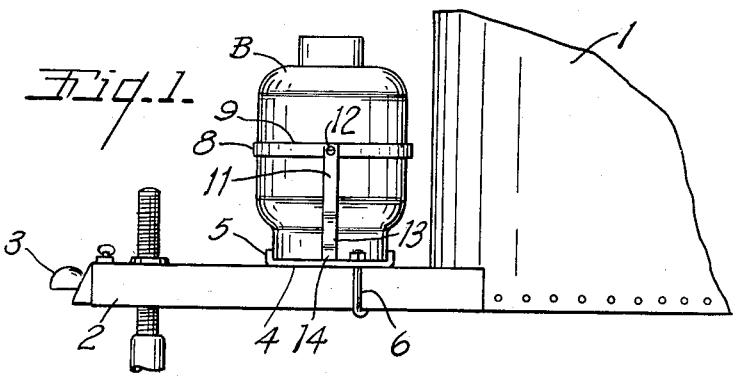
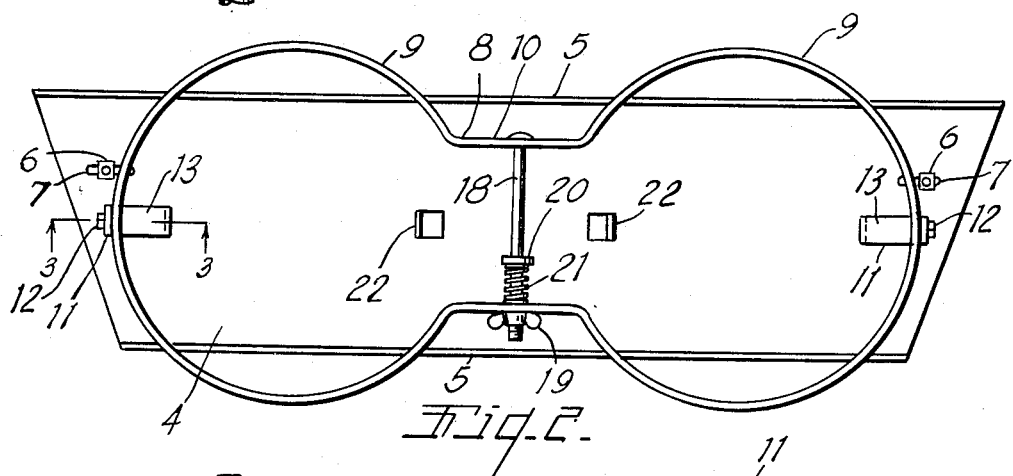
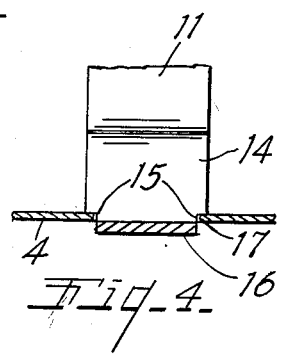
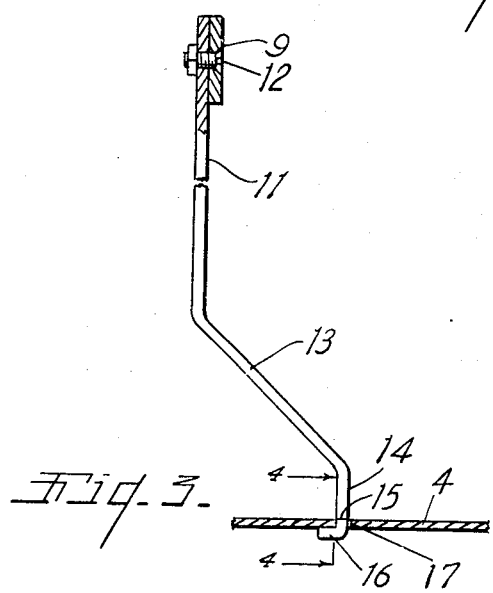
INVENTOR.
Harold W. Norris
BY
ATTORNEY.

United States Patent Office 2,837,217
Patented June 3, 1958

2,837,217

HOLDER FOR CLAMPING COMPRESSED GAS BOTTLES ON TRAILERS

Harold W. Norris, Battle Creek, Mich.

Application July 12, 1956, Serial No. 597,539

1 Claim. (Cl. 211—74)

This invention relates to improvement in holder for clamping compressed gas bottles on trailers. The principal objects of this invention are:

First, to provide a simple and inexpensive rack and clamp that will securely fasten compressed gas bottles on the tongue of mobile trailers.

Second, to provide a holder of the type described which is inexpensively fabricated from sheet metal parts and which can be collapsed for compact, inexpensive shipment.

Third, to provide a holder of the type described having a minimum of fasteners for connecting the parts in erected position.

Other objects and advantages of the invention will be apparent from a consideration of the following description and claim. The drawings, of which there is one sheet, illustrate a highly practical form of the bottle holder as applied to the tongue of a trailer.

Fig. 1 is a fragmentary side elevational view of a portion of a mobile trailer with the bottled gas holder operatively mounted thereon.

Fig. 2 is a plan view of the holder.

Fig. 3 is a fragmentary vertical cross sectional view taken along the plane of the line 3—3 in Fig. 2.

Fig. 4 is a fragmentary vertical cross sectional view taken along the plane of the line 4—4 in Fig. 3.

It is now common practice for mobile house trailers and particularly those of larger size having cooking and heating equipment to be equipped with racks for replaceably holding metal bottles of compressed gas for heating and cooking purposes. The present invention provides an inexpensive bottle holding rack that is easily attached to the trailer and which can be knocked down into a compact package for shipment.

Fig. 1 illustrates a portion of a front end of a trailer 1 having converging forwardly projecting tongue members 2 on which a hitch element 3 is mounted for connecting the trailer to a towing vehicle. Supported on the tongue members 2 is a flat plate 4 having upturned flanges 5 on its front and rear edges. Desirably the flanges are spaced apart by a distance equal to the diameter of the base of compressed gas bottles B. The pate is removably secured to the tongue members 2 by J hooks 6 hooked underneath the tongue members and passed upwardly through slots 7 near the ends of the plate.

The structure for clamping the bottles B on the plate is more particularly illustrated in Figs. 2 to 4 and consists of a looped band 8 of springable material positioned in spaced relationship above the plate. The band defines a pair of incomplete circles 9 connected by opposed straight connecting strips 10. The circles 9 are of somewhat larger diameter than the midportion of the bottles B and since compressed gas bottles commonly have enlarged center sections the circles project somewhat over the flanges 5 on the plate. The loop 8 is supported at each end by struts 11 that are removably connected to the outer sides of the circles 9 by bolts and nuts 12. The lower portions of the strips 10 are inclined inwardly and downwardly as at 13 and terminate in short upright portions 14 having notched corners 15 with outwardly turned lugs 16 on the reduced portions of the struts. The lugs 16 are passed downwardly through slots 17 in the plate 4 and then rocked outwardly by moving the upper ends of the struts inwardly against the band 8 where the struts are connected to the band. The edges of the notches 15 rest on the plate while the lugs 16 prevent upward disengagement of the struts from the plate.

The opposed intermediate portions 10 of the band 8 are connected by a clamp bolt 18 having a hand nut 19 by means of which the central portion of the band may be contracted to clamp the band around the bottles B. An abutment nut 20 on the bolt 18 acts as a stop for a spring 21 bearing against the inside of the band so that the band is automatically expansible to release the bottles when desired.

The central portion of the plate 4 is further provided with two ears 22 struck upwardly from slots in the plate and opposed to the upright portion 14 of the struts. Desirably the lower ends of the struts and the lugs 22 are spaced apart by a distance equal to the diameter of the bottom of the bottles B to laterally retain the bottoms of he bottles on the plate.

With the foregoing construction the gas bottles are securely and releasably clamped on the trailer and the holder is easily collapsed into a package somewhat thicker than the plate 4 by disconnecting the bolts 12 and tilting the struts 11 outwardly to disengage the lugs 16 from the plate. Single bottle holders may similarly be assembled using a looped band defining a single bottle loop and supported by the same type of removable strut releasably locked to the plate.

Having thus described the invention, what is claimed as new and is desired to be secured by Letters Patent is:

A holder for clamping compressed gas bottles on trailers comprising a flat base plate having upturned flanges on opposite edges spaced apart by a distance equal to the diameter of the base of the bottles to be held, a looped band of springable metal positioned in spaced relation above said plate and defining a pair of incomplete circles with opposed connecting strips therebetween, said circles extending outwardly over said flanges, a plurality of supporting struts removably connected to the ends of said loop and supported on said plate, downwardly and inwardly inclined lower portions on said struts terminating in upright shouldered ends with outwardly bent lugs passed through slots in said plate and lapped on the under side of the plate, ears struck upwardly from said plate and spaced diametrically from said shouldered ends by a distance equal to the diameter of the base of the bottles, and a clamp bolt passed through said connecting strips with a spring compressed between the bolt and one of the connecting strips to spread the loop and a hand nut to contract the loop.

References Cited in the file of this patent

UNITED STATES PATENTS

| 882,854 | Weaver | Mar. 24, 1908 |
| 1,465,185 | Sandberg | Aug. 14, 1923 |
| 1,741,136 | Naylor | Dec. 24, 1929 |
| 2,379,994 | Schwinn | July 10, 1945 |
| 2,631,076 | Redlich | Mar. 10, 1953 |
| 2,639,208 | Obenchain | May 19, 1953 |